Dec. 17, 1957     E. C. RHYNE, JR     2,817,051
INDUCTION MOTOR CONTROL SYSTEMS
Filed Dec. 22, 1955
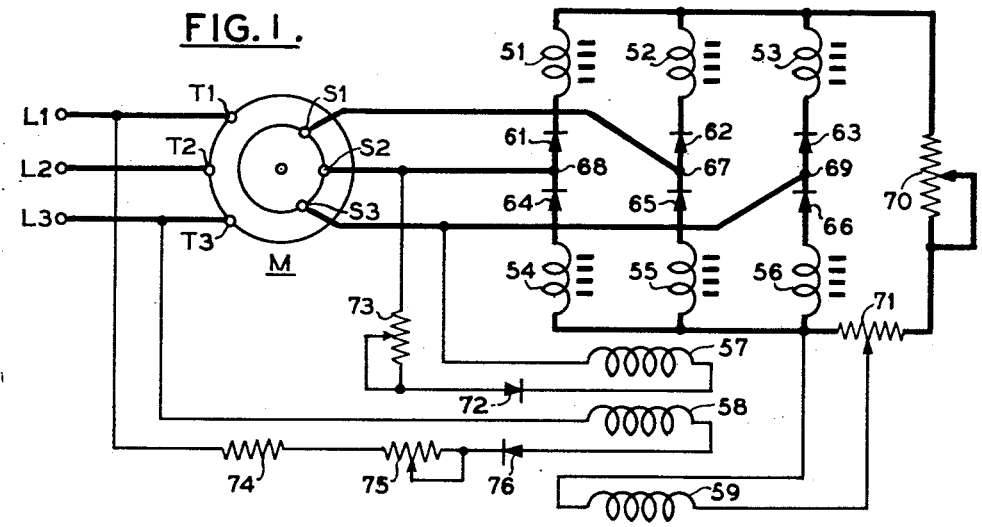
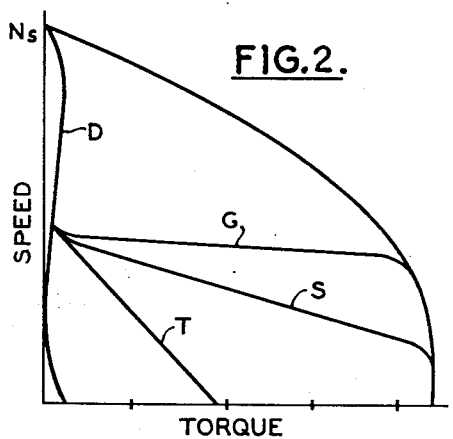
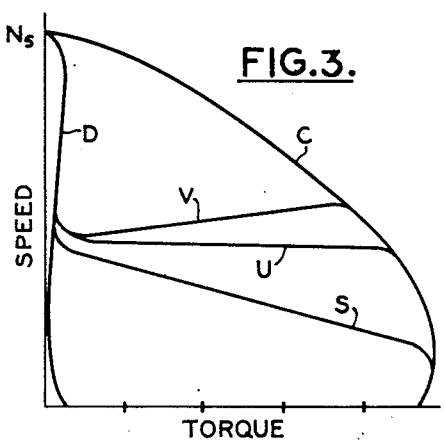

United States Patent Office 2,817,051
Patented Dec. 17, 1957

2,817,051
INDUCTION MOTOR CONTROL SYSTEMS

Earl C. Rhyne, Jr., East Pepperell, Mass., assignor to Cline Electric Manufacturing Company, Chicago, Ill., a corporation of Delaware Application December 22, 1955, Serial No. 554,864

8 Claims. (Cl. 318—240)

My invention relates to electric systems for controlling and regulating the speed of wound-rotor motors by means of variable impedance devices connected in series with the motor. More particularly, the invention relates to systems wherein the impedance devices for control and regulation of motor performance consist essentially of magnetically saturable inductance devices connected in the secondary circuit of the motor.

It is an object of my invention to improve such control systems toward smaller space requirements and better sensitivity of the secondary inductance devices including the appertaining components for controlling the effective impedance in the rotor circuit of the motor.

To this end, and in accordance with my invention, I connect a magnetic amplifier serially into the rotor circuit so that the saturable reactors and half-wave rectifiers in each branch of the amplifier are traversed by the rotor current, and I connect the magnetic amplifier to a resistance load circuit and vary the reactance of the saturable reactors by direct-current premagnetization in dependence upon a speed-responsive operating condition of the motor.

According to a further, more specific feature of my invention, the load circuit of the magnetic amplifier is provided with ohmic resistors, the reactors of the amplifier functioning for speed regulation whereas the resistors dissipate part of the wattage in the secondary circuit to minimize heating in the motor and permit giving the amplifier device a smaller size than otherwise required.

Another feature of my invention, aiming generally at minimizing the expenditure and space requirements of the system components, resides in the provision of a magnetic amplifier whose power input terminals are connected directly to the secondary motor terminals and whose output circuit includes a power dissipating resistor, the speed intelligence or regulating error voltage being applied to the control coils of the amplifier.

According to still another feature of the invention, the just-mentioned error voltage is composed of two component voltages of which one is taken from the slip rings of the motor to vary with the motor speed, whereas the other voltage is a constant but adjustable reference voltage taken from the primary circuit of the motor.

The foregoing and other objects, features and advantages of the invention, will be apparent from, and will be set forth in, the following description referring to the embodiments of the invention shown on the drawings in which:

Fig. 1 shows a schematic circuit diagram of a wound-rotor motor control system, and Figs. 2 and 3 are speed-torque diagrams explanatory of the system.

According to Fig. 1 the primary or stator terminals T1, T2, T3 of the wound-rotor motor M to be controlled are connected to the line terminals L1, L2, L3 of a three-phase alternating-current supply line. The secondary or slip-ring terminals S1, S2, S3 of motor M are connected to a three-phase bridge-type amplifier which comprises six saturable reactors 51 to 56 whose saturation is controlled by two sets of direct-current windings 57, 58 inductively associated with the respective cores of all six reactors. Also shown is an auxiliary direct-current winding 59 which is likewise inductively linked with the magnetizable cores of all six reactors for a purpose explained in a later place. The magnetic amplifier in the rotor circuit further comprises six rectifier components 61 to 66 which together with the reactor windings 51 to 56, form a three-phase bridge circuit whose input terminals 67, 68, 69 are connected with the respective secondary terminals S1, S2, S3 of the motor. The amplifier delivers rectified output current to a load resistor 70. The direct-current load circuit further comprises an auxiliary resistor 71 in series with resistors 70.

The control winding 57 of the magnetic amplifier is connected across the secondary terminals S2 and S3 of the motor through a calibrating rheostat 73 whose setting remains fixed during normal operations. A three-phase full-wave rectifier 72 is inserted in the circuit of winding 57. The control winding 58 of the magnetic amplifier is supplied with normally constant voltage from the motor primary terminals T1 and T3 through a calibrating resistor 74 in series with a speed control rheostat 75 and in series with a blocking rectifier 76.

The circuit polarities are such that the speed intelligence voltage taken from across secondary terminals S2, S3 is applied to amplifier control winding 57 in the direction required to saturate the iron cores of the reactors 51 to 56. The reference voltage, adjusted by means of the speed control rheostat 75, is applied to the amplifier control winding 58 with the polarity required to cause desaturation of the magnetic amplifier cores. Resistor 74 merely serves calibrating purposes and normally remains at a fixed adjustment so chosen that the control rheostat 75 will operate over the proper range.

It will be recognized that a considerable simplification is achieved by having the variable impedance device in the rotor circuit also operate for the purpose of mixing and amplifying the control signals. However, Fig. 1 also serves to illustrate another advantageous feature generally applicable in control systems according to the invention. This feature resides in a compounding device for modifying the speed-torque characteristic in a desired manner.

This compounding device comprises the amplifier winding 59 which is connected across the resistor 71 and imposes a modifying control upon the amplifier. The current flowing through the winding 59 is directly proportional to the load current flowing through resistor 71. This provides for compounding or IZ compensation of the machine in the manner explained presently.

If the motor windings, stator and rotor, had no impedance, i. e. no resistance or reactance, the voltage appearing at the rotor terminals S1, S2, S3 would be strictly proportional to the slip. Therefore, if the rotor voltage were held perfectly constant, the motor speed would be absolutely constant regardless of changes in torque. However, rotor and stator do have impedance and this upsets the strict proportionality to some extent. As the torque on the motor shaft increases, the stator and rotor currents must increase in order to support the load. These currents cause impedance drops through the stator and rotor circuits such that for the same speed, at a greater load, the rotor voltage appearing at points S1, S2 and S3 decreases. If the regulator holds the voltage absolutely constant, the speed must decrease with increase in load, resulting in a larger rotor slip. The droop of these characteristics can be compensated by feeding into the mixer-amplifier a corrective signal proportional to the rotor current and of the same polarity as the rotor volts. This is done by the feedback components 71, 59. By properly adjusting the amount of feedback, the system can be made to have "rising," "flat compounded," or "drooping" characteristics. Such compounding by current feedback is helpful in designing a system with lower loop gain, which reduces the size of the amplifying apparatus.

Fig. 2 illustrates the effect of varying loop gain—i. e. varying the effectiveness of the rotor voltage feedback into the mixer-amplifier. In Fig. 1 the loop gain of the system would be increased by decreasing the resistance 73. Conversely it would be decreased by increasing the resistance 73. In Fig. 2 a high-gain system performance is shown in curve G. Curve T relates to a low-gain system. The performance of a system with nominal gain is shown in curve S. Making use of a system of nominal gain, the speed regulation can be improved by means of the IZ-compensation, i. e. by properly setting or selecting the resistance of resistor 71 in Fig. 1. This is illustrated in Fig. 3. Curve S in Fig. 3 relates to an uncompensated system of nominal gain, curve U to the same system "flat compounded," and curve V to the same system "over compounded."

Returning to Fig. 1, a system containing a magnetic amplifier in the rotor circuit can also be used for controlling the motor performance by amplifier reactance in combination with a variation in amplifier load resistance. The particular three-phase amplifier shown, results in applying a direct current voltage to the power resistor 70. This resistor can be varied as is schematically represented by the illustration of a slider contact, although it will be understood that a corresponding variation may also be obtained by means of contactors which selectively short-circuit respective portions of the resistor 70. The setting of resistor 70 may be coordinated to the setting of the control rheostat 75, as is explained in my copending application Serial No. 554,865, filed December 22, 1955, now Patent No. 2,793,338.

It will be undersood by those skilled in the art, upon a study of this disclosure, that the invention can be embodied in control systems other than the one specifically set forth in this specification, without departing from the essence of my invention and within the scope of the claims annexed hereto.

I claim:

1. A motor control system, comprising a wound-rotor motor having a rotor circuit, a magnetic amplifier having saturable reactors and rectifiers connected with each other in said rotor circuit and forming together a rectifier network having direct-current output terminals, load resistor means connected across said output terminals, said amplifier having saturation control means inductively linked with said reactors, and a source of variable voltage indicative of the motor speed and connected with said saturation control means for controlling said amplifier to regulate said speed.

2. A motor control system, comprising an induction motor having slip rings and having a rotor circuit connected to said slip rings, a magnetic amplifier having saturable reactor means and rectifier means serially interconnected in said rotor circuit to be energized by secondary current of said motor, said reactor means having saturation control means for varying the reactance of said reactor means, said control means comprising two sources of control voltage differentially related to each other relative to their effects upon the saturation of said reactor device, one of said sources having adjustable constant voltage to provide a desired speed reference, and said other source being connected across said slip rings and having a variable voltage corresponding to the secondary voltage of said motor to provide variable speed intelligence.

3. In a motor control system according to claim 2, said control means comprising a third source of voltage, said third source being current-responsively connected with said rotor circuit and having variable voltage dependent upon the current in said rotor circuit, whereby a compounding correction is imposed upon the reactance of said reactor device.

4. A motor control system, comprising an induction motor having a rotor circuit, a magnetic amplifier connected in series with said rotor circuit, said magnetic amplifier having saturation control means which comprise two direct-current magnetizing coils, a voltage supply circuit connecting one of said coils for controlling said amplifier in dependence upon the secondary voltage of said motor, a source of adjustable constant voltage connected with said other coil to provide a reference voltage indicative of the desired motor speed, said two coils being magnetically poled in opposed relation to each other.

5. A motor control system, comprising a wound-rotor motor having a rotor circuit, a self-saturating magnetic amplifier having pairs of parallel branches serially connected in said rotor circuit, each of the two branches of each pair being composed of a saturable reactor and a half-wave rectifier poled in opposition to the half-wave rectifier of the other branch of the same pair, said magnetic amplifier having a load circuit and resistance means in said load circuit, saturation control coils inductively linked with said reactors, and control means connected with said coils and having a source of variable voltage responsive to changes in a given operating condition of said motor.

6. A motor control system comprising a wound-rotor motor having a multi-phase rotor circuit, a self-saturating magnetic amplifier having a pair of antiparallel branches serially connected in each of the respective phases of said rotor circuit, each branch comprising a saturable reactor and a half-wave rectifier, said pairs of branches having an amplifier load circuit in common, adjustable resistor means in said load circuit, said reactors having saturation control coils, and control means connected with said coils and having a source of variable voltage responsive to changes in a given operating condition of said motor.

7. A motor control system comprising a wound-rotor motor having a multi-phase rotor circuit, a self-saturating magnetic amplifier having a pair of antiparallel branches serially connected in each of the respective phases of said rotor circuit, each branch comprising a saturable reactor and a half-wave rectifier, said pairs of branches having an amplifier load circuit in common and having resistor means connected in said load circuit, said saturable reactors having three saturation control circuits, a first one of said control circuits having adjustable constant voltage to provide a desired speed reference, a second one of said control circuits being connected across said slip rings and having a variable voltage corresponding to the secondary voltage of said motor to provide variable speed intelligence, said first and second control circuits having mutually opposed poling relative to their respective effects upon the saturation of said reactors, and said third control circuit being connected to said amplifier load circuit for response to the current in said load circuit to impose a corresponding correction upon said reactors.

8. In a motor control system according to claim 7, said third saturation control circuit of said magnetic amplifier being connected across a portion of said resistor means to provide compounding voltage proportional to the voltage drop of said resistor portion.

References Cited in the file of this patent

UNITED STATES PATENTS

| Re. 19,853 | Stansbury | Feb. 11, 1936 |
| 1,930,279 | Morton | Oct. 10, 1933 |
| 2,528,467 | Bulliet | Oct. 31, 1950 |
| 2,717,349 | Lee | Sept. 6, 1955 |

FOREIGN PATENTS

| 751,030 | Germany | Apr. 27, 1953 |